United States Patent
Lin (10) Patent No.: US 10,363,902 B2
(45) Date of Patent: Jul. 30, 2019

(54) ANTI-THEFT REMOTE KEYLESS ENTRY SYSTEM USING FREQUENCY HOPPING WITH AMPLITUDE LEVEL CONTROL

(71) Applicant: TRW AUTOMOTIVE U.S. LLC, Livonia, MI (US)

(72) Inventor: Xing Ping Lin, Orchard Lake, OH (US)

(73) Assignee: TRW AUTOMOTIVE U.S. LLC, Livonia, MI (US)

(*) Notice: Subject to any disclaimer, the term of this patent is extended or adjusted under 35 U.S.C. 154(b) by 501 days.

(21) Appl. No.: 14/784,441

(22) PCT Filed: Jul. 17, 2014

(86) PCT No.: PCT/US2014/046945
§ 371 (c)(1),
(2) Date: Oct. 14, 2015

(87) PCT Pub. No.: WO2015/013087
PCT Pub. Date: Jan. 29, 2015

(65) Prior Publication Data
US 2017/0320465 A1    Nov. 9, 2017

Related U.S. Application Data

(60) Provisional application No. 61/856,823, filed on Jul. 22, 2013.

(51) Int. Cl.
*G07C 9/00* (2006.01)
*B60R 25/24* (2013.01)

(52) U.S. Cl.
CPC .......... *B60R 25/24* (2013.01); *G07C 9/00182* (2013.01)

(58) Field of Classification Search
CPC ....... B60R 25/24; B60R 24/245; B60R 25/00; B60R 25/04; B60R 25/103;
(Continued)

(56) References Cited

U.S. PATENT DOCUMENTS

| 5,828,693 A | 10/1998 | Mays et al. |
| 5,898,230 A | 4/1999 | Bartel et al. |

(Continued)

FOREIGN PATENT DOCUMENTS

| DE | 102005039562 | 3/1975 |
| JP | 2008240315 | 10/2008 |
| WO | 0125060 | 4/2001 |

OTHER PUBLICATIONS

PCT/US2014/046945 International Search Report and Written Opinion, completed Oct. 12, 2014.

*Primary Examiner* — Quan-Zhen Wang
*Assistant Examiner* — Stephen R Burgdorf
(74) *Attorney, Agent, or Firm* — Tarolli, Sundheim, Covell & Tummino LLP (57) ABSTRACT

A method for defeating a two-thief attack on a passive RKE system by using frequency hopping. Radio frequency signals are transmitted between a fob and a vehicle. The transmitted signals hop between at least two radio frequency transmitting channels in a particular pseudo-random pattern known to the vehicle. At the vehicle, the transmitted signals are received in a process that is sequentially adjusted to take account of the known characteristics of each portion of the known pattern. Anomalies in the pattern of the received signals are detected and, if the anomalies exceed permissible limits, access to said vehicle is blocked.

6 Claims, 6 Drawing Sheets

(58) Field of Classification Search
CPC ............ G07C 9/00182; G07C 9/00309; G07C 2009/00555; G07C 2009/00793; G08C 17/02; H04L 63/123
USPC .............. 340/5.72, 426.36, 426.1, 5.61, 5.63
See application file for complete search history.

(56) References Cited

U.S. PATENT DOCUMENTS

| | | | |
|---|---|---|---|
| 6,603,388 B1 | 8/2003 | Perraud et al. | |
| 8,860,550 B2 | 10/2014 | Nakashima et al. | |
| 2005/0237161 A1 | 10/2005 | Lee et al. | |
| 2006/0114100 A1* | 6/2006 | Ghabra | E05B 81/78 340/5.61 |
| 2007/0090917 A1* | 4/2007 | Parnaby | B60R 25/24 340/5.22 |
| 2011/0298646 A1* | 12/2011 | Hellemans | H04N 5/4403 341/176 |
| 2012/0252365 A1 | 10/2012 | Lam | |
| 2012/0310447 A1* | 12/2012 | Toki | B60R 25/24 701/2 |
| 2013/0086664 A1* | 4/2013 | Conner | H04W 12/06 726/7 |
| 2013/0089066 A1 | 4/2013 | Murakami et al. | |

* cited by examiner

| Power levels versus receiver performance with different bandwidths | | | |
|---|---|---|---|
| Fob (or vehicle) | Vehicle receiver (or Fob) | Theft Receiver | |
| Transmission level | Narrow band receiver | Wide band receiver at distance > 0.2 meter from owner | Wide band receiver at distance < 0.2 meter from owner |
| Level A | Yes | Yes | Yes |
| Level B | Yes | No | Yes |
| Level C | No | No | Yes |

ANTI-THEFT REMOTE KEYLESS ENTRY SYSTEM USING FREQUENCY HOPPING WITH AMPLITUDE LEVEL CONTROL

CROSS REFERENCES TO RELATED APPLICATIONS

This application filed under 35 U.S.C § 371 is a national phase application of International Application Serial Number PCT/US/2014/046945 filed Jul. 27, 2014, which claims priority to U.S. Provisional Application 61/856,823, filed Jul. 22, 2013, and is hereby incorporated herein by reference in its entirety.

FIELD OF THE INVENTION

The present invention is directed to method for preventing security breaches of vehicle remote keyless entry systems.

BACKGROUND

Vehicles may be equipped with passive electronic entry systems generally referred to as remote keyless entry ("RKE") systems. Such RKE systems allow entry into the vehicle without using a conventional, mechanical key. Passive RKE systems operate without the vehicle operator activating any push-buttons on the fob itself. A passive RKE may use a low frequency ("LF") radio signal that is transmitted by the vehicle to a fob carried by the vehicle owner. The fob automatically responds by returning a radio frequency ("RF") signal back to the vehicle. Upon receipt of a proper RF response signal, the vehicle will unlock the doors to permit driver entry into the vehicle.

Specifically, in a passive RKE system, the fob/vehicle interaction may be initiated by the operation of the door handle. Upon detection of contact with the door handle, the RKE controller at the vehicle will trigger an LF transmitter inside the vehicle. The vehicle-based LF transmitter will create an LF field in the vicinity of the vehicle door that will, in turn, be detected by an LF receiver inside the fob. Upon detection of a proper LF field, the fob will transmit a response command signal back to the vehicle using a digital message encoded on a RF signal. The RF receiver inside vehicle will decode the digital message and, if the content of the message is satisfactory, will unlock the vehicle doors. Similar methods are sometimes used for enabling an "engine start" button on the dashboard of the vehicle.

Identification codes and encryption are conventionally used to ensure that the LF-RF communication link between the fob and the vehicle is secure. Such codes and encryption are very difficult to duplicate. Therefore, the fob message required to gain entry into the vehicle cannot readily be synthesized by a thief. However, even with such codes and encryption, potential vulnerabilities still exist. Two thieves working in concert can trigger, intercept, and generate a bona fide fob response signal to trick the vehicle RKE system into believing that the owner's authorized fob is near the vehicle, when, in fact, the owner's authorized fob is well away from the vehicle.

For example, assume that the vehicle owner is away from the vehicle with the authorized fob. Two thieves want to gain access to the vehicle. A first thief stays close to vehicle and the second thief stays close to the owner. Both thieves have an LF receiver and a repeater (transceiver). The first thief approaches the vehicle and lifts up the door handle, which triggers the vehicle-based LF transmitter. The first thief's LF receiver receives the information transmitted by the vehicle-based LF transmitter. The first thief will then transmit the signal to the second thief through RF. The second thief's transceiver receives the information sent by the first thief and transmits an LF signal, with the appropriate information to the authorized fob carried by the vehicle owner. The owner's authorized fob receives the signal and transmits an RF command signal (the response signal) to unlock the vehicle door. The second thief's transceiver receives the command signal and then re-transmits the signal back to first thief. The first thief's transceiver receives it and re-transmits the command signal to the RF receiver inside the vehicle. The vehicle receiver recognizes the command since it originated from the authorized fob and unlocks the car door allowing the first thief to gain access to the vehicle.

SUMMARY OF THE INVENTION

In accordance with one aspect of the present invention, a method is provided for preventing security breaches of passive remote keyless entry systems for a vehicle, comprising the steps of transmitting signals between a fob and the vehicle at frequencies that change in a particular pattern, and detecting at the receiving side anomalies in the pattern of the received signals.

In accordance with another aspect of the present invention, another method is provided for preventing security breaches of passive remote keyless entry systems for a vehicle. The method comprises the steps of transmitting radio frequency signals from a fob to a vehicle, including the step of hopping between at least two radio frequency transmitting channels in a particular pseudo-random pattern known to the vehicle, receiving at the vehicle each portion of the particular pattern and sequentially adjusting the reception to take account of the known characteristics of each portion of the known pattern, detecting at the vehicle anomalies in the pattern of the received signals, and blocking access to the vehicle when detected anomalies exceed permissible limits

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
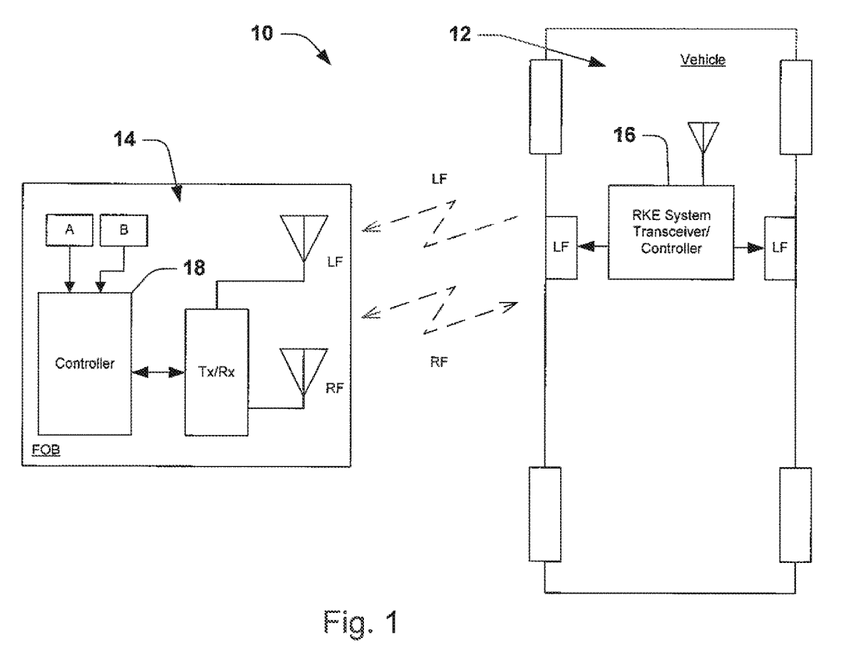
FIG. 1 is a schematic block diagram of a remote keyless entry system made in accordance with the present invention.

Referring to FIG. 1, a vehicle RKE system 10 in accordance with an example embodiment of the present invention is shown. The RKE system includes a vehicle-based portion 12 and a fob 14. The vehicle-based portion 12 includes a transceiver 16 having an electronic controller programmed to perform the functions described below. The vehicle-based portion 16 can transmit low frequency ("LF") initiation signals and can receive RF command signals. For example, when the vehicle door handle is contacted, an associated sensor senses such condition and the transceiver will generate an LF signal in the area of the door handle to initiate communications with the fob 14. The LF signal will have vehicle identification information included as part of the signal. The vehicle-based portion 16 then monitors for an RF response command signal from the fob 14, and, upon receipt of an RF response command signal, will initiate the control commanded, e.g., unlock the doors.

In turn, the fob 14 includes a controller 18 and appropriate transceiver electronics programmed in accordance with the present invention as described below so as to monitor for an LF initiation signal from the vehicle-based portion 16. Upon receipt of an LF initiation signal from the vehicle-based portion 16, the fob 14 transmits back to the vehicle-based unit an RF command signal including information identifying the fob and the command to unlock the doors.

The communications arrangement between the fob and the vehicle-based unit include appropriate identification information and the transmitted signals are encrypted for security purposes. In accordance with the present invention, the controllers of the vehicle-based portion 16 and the fob 14 are programmed as described below so as to defeat a two thief potential. In accordance with the present invention, a multiple channel frequency hopping scheme is used in an encrypted sequence with proper power and channel space management.

In accordance with an example embodiment of the present invention, the arrangement of the present invention uses multiple programmable frequency channels for communication, with channel separations that change with each transmission. Different frequency channels are used to transmit each time and the sequence of transmit channel is shared in an encrypted manner or prearranged and known only by the owner's fob 14 and to the vehicle-based portion.

The pre-arranged communication channel sequence is periodically reset responsive to a successful start of vehicle and a predetermined number of door opening activities. Only a limited number of door handle lifts are permitted in any given period, thereby to restrict the thief attack on the encrypted sequence. Channel distance management is also employed, where at least two channels or two groups of channels are separated by a wide frequency range. Both fundamental frequency and harmonics communication channels are checked to determine whether the fob transmitted signal spectrum displays the characteristics of close distance signal behavior. Different frequency signals have different propagation characteristics over the distance over the ground, through the building and the relay devices. Transmitting power levels and channel widths are managed to ensure a sufficient normal RF link between the fob and vehicle-based portion, while forcing any intervening thief receiver to have relative narrow bandwidth to detect the signal.

A lower power level is used to defeat a thief that gets overly close to the owner. The lower power level is 'fake', in the sense that the transmission is so low power that it would not normally be received by the vehicle receiver. However, if the thief's receiver is quite close to the owner's fob, the receiver will pick up the low level transmission from the owner's fob. Thus, the mimic signal generated by the thieves will include the fake signal, which will be re-transmitted to the vehicle at a normal power level. The vehicle-based receiver will therefore receive the re-transmitted signal and, because the vehicle-based receiver "knows" it should not receive this response signal, it will recognize the response signal as false and will not respond. If a theft system tries to detect the RSSI level of the owner's fob signal, the detection process will introduce a delay that will be detected via the response time monitoring (see below).

The example embodiment of the present invention further uses, in different parts of the sequence, a narrow band low level signal and wide band high level signal transmission. The receiver is synchronized with the sequence and will match these transmissions with narrow band high sensitivity, and wide band low gain, receiver characteristics respectively.

Moreover, the time of receipt of the fob response is monitored by the receiver to determine whether the actual response time conforms to the expected response time. Any delay in the receipt of the response will signify that the response signal is false and should not be acted upon to allow vehicle access.

If the fob and the vehicle-based portion both include RF transceivers to receive and transmit RF signals (e.g. 315 MHz or 434 MHz), the vehicle-based portion can transmit either the RF signal or the LF signal (e.g. 125 kHz or 100 kHz) in a sequence of time slots, where the order of the RF/LF signals in the sequence is encrypted, that is, is known only to the fob and the vehicle-based portion. The fob will use the known sequence of transmissions to select the appropriate RF or LF receiver in the various time slots to receive the LF and RF signals, and to set the receiver characteristics to the appropriate values for each time slot. To minimize system cost, the fob could be equipped with receivers for just one radio frequency (such as 315 Mhz, only) and one low frequency (such as 125 kHz, only). Alternately, several RF and LF channels could be provided and switched among, through use of the frequency hopping features described above.

Figure 2:
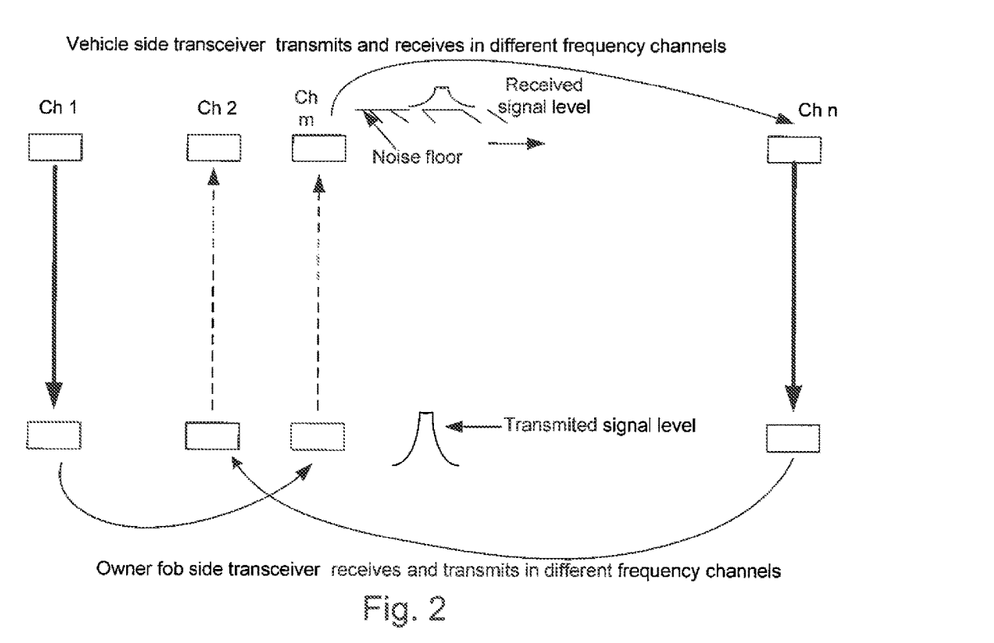
FIG. 2 depicts operation of a remote keyless entry system using multiple communication channels operated in an encrypted sequence.

FIG. 2 is a graphical depiction of the interaction between the fob and the vehicle-based receiver in accordance with an example embodiment of the present invention. The vehicle-based transceiver 16 transmits and receives using different frequency channels. The owner's fob 14 similarly receives and transmits using different frequency channels. The multiple communication channels are utilized in a particular sequence. The sequence is "encrypted" in the sense that the sequence is known only to the fob and the vehicle. The shared knowledge of the sequence could be prearranged, or alternatively communicated between the fob and vehicle in one or more encrypted messages sent during the interaction. In the figure, the vehicle (represented by the top row of boxes) sends an LF initiation signal in channel 1. The fob (represented by the bottom row of boxes) replies with a message in channel m. The vehicle in turn responds in channel n, whereupon the fob sends the final portion of the interaction in channel 2.

The frequency-changing arrangement of the present invention will defeat a theft attempt, even if a thief has a channel-programmable receiver that can receive one or two channels at the same time, since a thief's receiver will not have advance knowledge of the sequence in which transmitting channels are used. If a thief tries to decipher the transmitting sequence by pulling the door handle many times, the attempt will be blocked by a limit, programmed into the vehicle-based portion, in the number of unsuccessful trials that are permitted. Furthermore, the pre-arranged sequence will be reset after a certain number of applications and certain authentic confirmation.

The signal processing arrangement of the present invention will further defeat a theft attempt where the thief wants to use multiple channels in parallel to receive the signal since the channel spacing, in accordance with an implementation of the present invention, will itself change for different transmissions.

Figure 3:
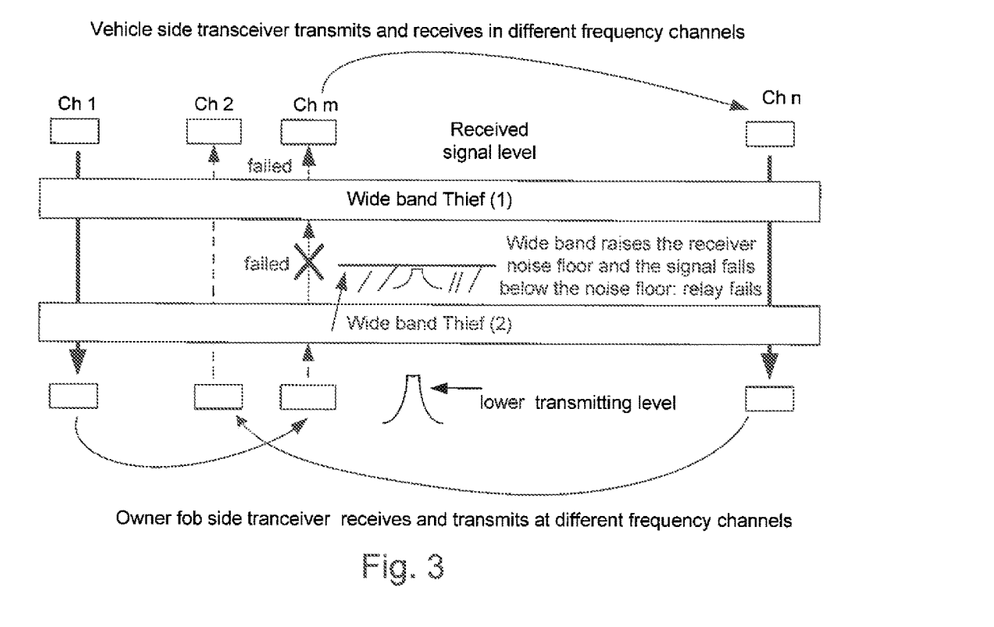
FIG. 3 depicts an attempted theft of the remote keyless entry system of FIG. 2, using a wideband receiver to relay information.

Furthermore, the signal processing arrangement of the present invention will defeat a theft attempt even if the thief uses a wide band receiver to receive all channel signals and relays the information as show in FIG. 3. FIG. 3 shows the intervention of a thief into the communication process shown in FIG. 2. Hopping channels are designed, in accordance with the present invention, to be separated by a large frequency range. Furthermore, the transmission power of the fob 14 is designed to be low, yet adequate for sufficient short range passive operation with a vehicle-based receiver operated at narrow bandwidth. A thief's receiver, if given a wide bandwidth to permit operation over many frequencies, will have a high noise floor and thus will not be able to pick up the fob's low power signal designed, for a narrow bandwidth receiver, unless the thief's receiver is very close to the fob 14.

For example, a normal system channel bandwidth could be 50 kHz, and channel hopping could be performed in various channels over the range of frequencies 419 MHz to 434 MHz. The ratio of channel range to bandwidth in that case is 15 MHz divided by 50 kHz, or 300. This means that the sensitivity difference is 10 log(300), or 24.8 dB. The owner's fob 14 is designed to operate from a maximum 3 meter range from the vehicle. According to a rule of thumb concerning free space RF path loss, to double the RF communication distance, the transmitting power or receiver sensitivity needs to be increased by 6 dB. The ratio of 24.8 dB/6 dB=4.2 requires the operating distance to be shortened by half, four times, that is, by sixteen $((\frac{1}{2})^4=16)$. Thus, the usual communication range of 3 meters must be shortened to 2 meters/16, or 0.19 meter. This means that thief, with such a wide band receiver, must be within 0.19 meter of the fob 14 to receive its low level transmissions.

Figure 4:
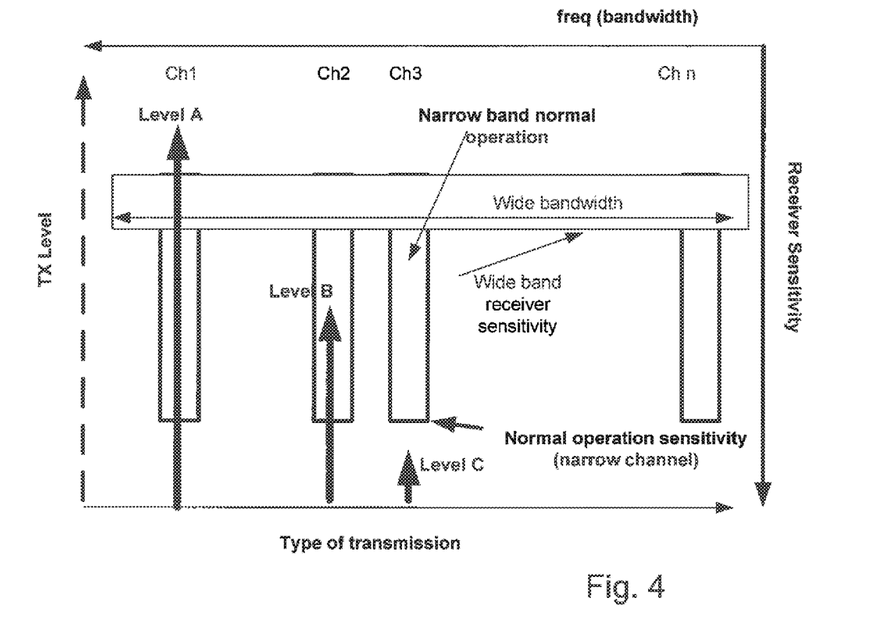
FIG. 4 is a graphical representation of the relationships between transmitting power level and frequency, on the one hand, and receiver bandwidth and sensitivity, on the other hand.

The present invention contemplates that fob transmissions will be made at multiple power levels, e.g. three levels, to exploit the high sensitivity that a thief's receiver must have. FIG. 4 illustrates the three different fob transmitting power levels vs. the receiver performance with different bandwidths. A wide bandwidth receiver has less sensitivity and a narrow band receiver has higher sensitivity. If the transmitting signal level is higher than the receiver sensitivity and within the receiving frequency range, then communication is established.

Level A will be received by a thief's receiver (although the signal amplitude is so great that it may saturate a thief's receiver and thereby interfere with the receiver's ability to mimic the fob signal). Level B and C fall below the sensitivity of the thief's receiver, unless the thief is exceedingly close to the fob. In FIG. 4, level C is also below the sensitivity of the narrow-band vehicle receiver; because of this, a level C signal is not normally expected to be received by the vehicle. (See the above discussion regarding low-level 'fake' signals). The vehicle receiver will, however, receive the level A and B signals properly. The gain of the receiver will be reduced for level A signals and level B signals fall within the normal gain range of the vehicle receiver.

Figure 5:
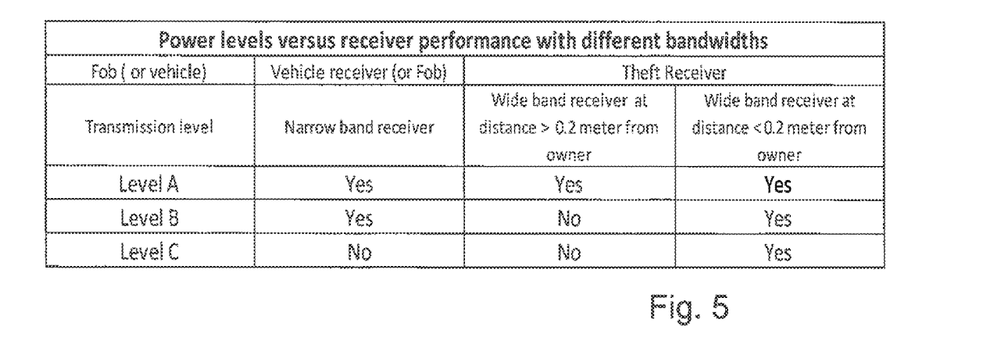
FIG. 5 is a table depicting responses to different power levels of wide band receivers versus narrow band receivers.

FIG. 5 is a table that reflects the content of FIG. 4, and summarizes the relative performance of the vehicle receiver (narrow band) and the thief receiver (wideband) for various power levels. As can be seen in the figure, the thief receiver does not match the vehicle receiver performance over the set of three transmission levels, being either too inclusive (when spaced very close from the fob) or not inclusive enough (when spaced at a normal distance).

Figure 6:
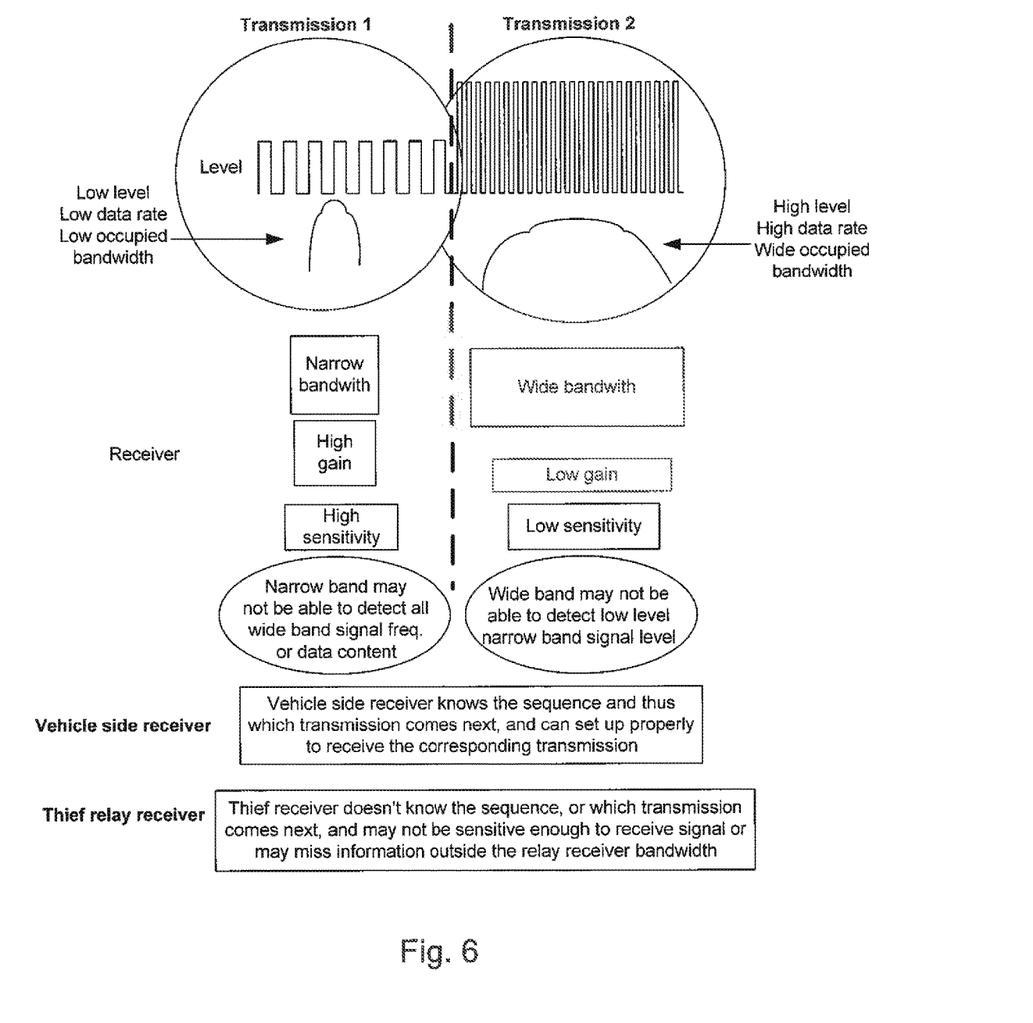
FIG. 6 shows data rate, signal level, and bandwidth control of a remote keyless entry system in accordance with the present invention.

In accordance with an alternative embodiment of the present invention, the communications arrangement could use (a) a narrow band low level signal with low data rate, time-slot matched at the receiver with narrow band high sensitivity receiver setting, and (b) a wide band high level signal with high data rate transmission, time-slot matched at the receiver with wide band low gain receiver settings. FIG. 6 depicts this alternative arrangement of data rate, signal level, and bandwidth control. The vehicle side receiver knows the sequence of transmissions and thus can set the receiver up properly to receive the transmission in the next time slot. The thief will not know the sequence, and will not be able to setup a receiver 'on the fly'. The thief may chose to use a narrow band receiver, which will not be able to detect all of the wide band signal frequency or data content, or a wide band receiver, which will not be able to detect low level narrow band signals. In either case, the receiver will not be able to accurately reconstruct the fob signal. The receiver will monitor the signal which it receives, will discover inaccuracies in the format or content of the signal broadcast by the thief, and will therefore not grant access to the vehicle.

In the automotive industry, an RKE system typically uses specific VHF/UHF frequencies to receive and transmit. For example, an RF transceiver inside a fob could use 315 MHz or 434 MHz to receive and transmit messages. The transceiver depicted in FIG. 2 is not constrained to these conventional frequency channels and instead has broader application. The transceiver inside the fob could use any RF frequency in the 100 MHz to 1 GHz range in both directions. It also could use a lower frequency such as 125 kHz, 100 kHz, 30 kHz to receive and VHF/UHF to transmit. The basic fob for passive entry would use a low frequency receiver to receive low frequency (125 kHz range) signal and RF transmitter to transmit RF frequency such as 315 MHz or 434 MHz signal. An RF transceiver could be used to speed up the communication at an increased system cost. Four different variations of the system will be described in connection with FIGS. 7-10, but those skilled in the art should appreciate that those are examples only and other alternative variations may instead be used.

Figure 7:
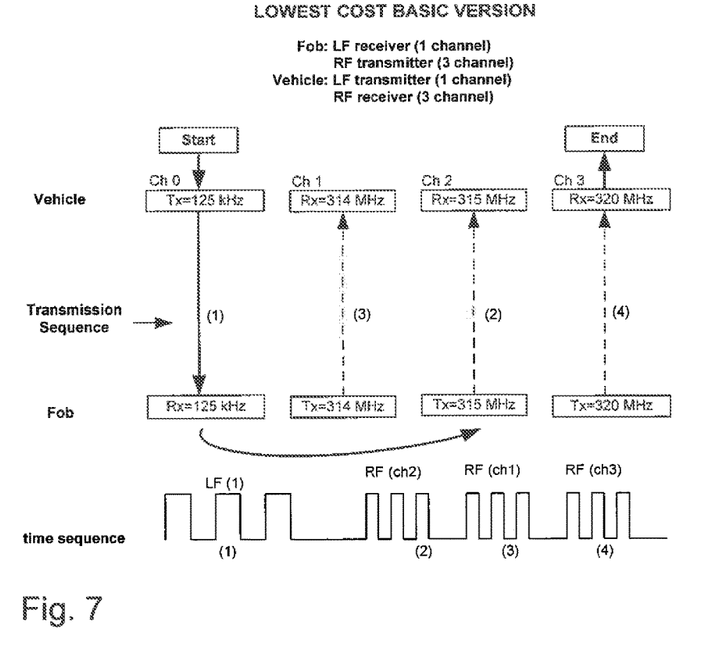
FIG. 7 shows a frequency-hopping process performed by a low cost example embodiment of the present invention including a fob having one LF receiving channel and three RF transmitter channels.

FIG. 7 depicts a low cost implementation of the present invention having a fob with a one-channel LF receiver and three-channel RF transmission. Note that two channels (314 and 315 MHz) are close and the third channel (320 MHz) is further away. It could also be Ch1=314.6 MH, Ch2=315 MHz, Ch3=312 MHz for a very narrow band application.

LF from vehicle-based portion (step (1) in the sequence) initiates the action. Following initiation, the remainder of the sequence comes in the direction from the fob to the vehicle-based portion. Frequency channel hopping of transmissions from the fob only happens at the three RF frequencies. The fob chooses channels for steps (2), (3) and (4) in a sequence that, as previously stated, is encrypted. The sequence could be previously programmed into the fob and receiver, or could be communicated from the vehicle to the fob in the LF initiation signal or from the fob to the vehicle in the first response. The synchronization information communicated could be the sequence itself, coded with encryption for security, or could alternatively be a seed number for a pseudorandom number generator, modulo 3, found in both the fob and the vehicle-based portion. In any case, the vehicle-based portion will know the sequence and will be able to anticipate the transmission characteristics that will be used in the next time slot and adjust the receiver accordingly. The vehicle-based portion will examine the received message for content and format fidelity, and will allow access to the vehicle only if the received sequence matches expectations within a certain tolerance.

Figure 8:
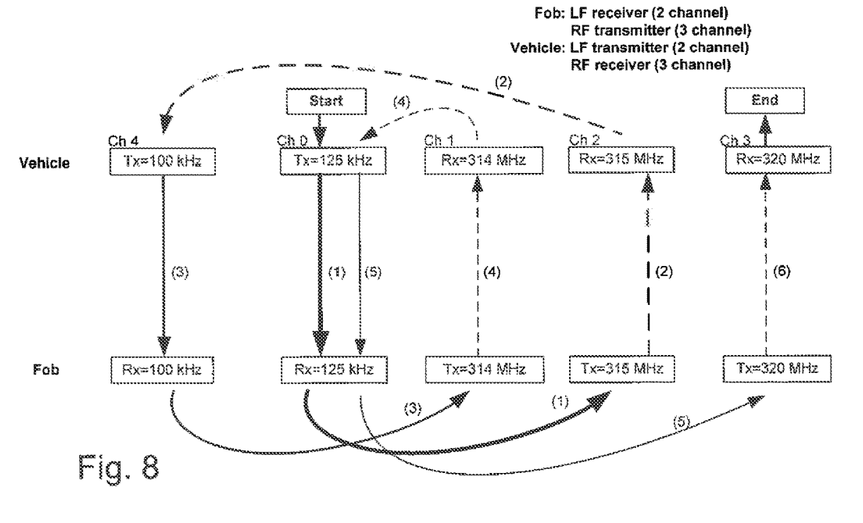
FIG. 8 shows a frequency-hopping process performed by another example embodiment of the present invention, where in this case the fob has two LF receiving channels.

The FIG. 8 version differs from the FIG. 7 variant in that multiple LF channels (2, in the figure) are included and also used in the frequency hopping sequence. LF from the vehicle-based portion initiates the action, as before, and transmission frequency channel hopping happens at both LF and RF frequencies as well as both directions. LF frequency channels are used for communication from the vehicle-based portion to the fob and RF frequency channels are used for communication from the fob to the vehicle-based portion. If only one LF channel is used, then the Fob will receive LF signals in that channel, perhaps at multiple times in the sequence, and will transmit at different RF frequencies. The vehicle-based portion transmits steps in the sequence in the LF channels. The LF and RF steps in the frequency hopping sequence are encrypted and thus proceed in a carefully choreographed order.

Figure 9:
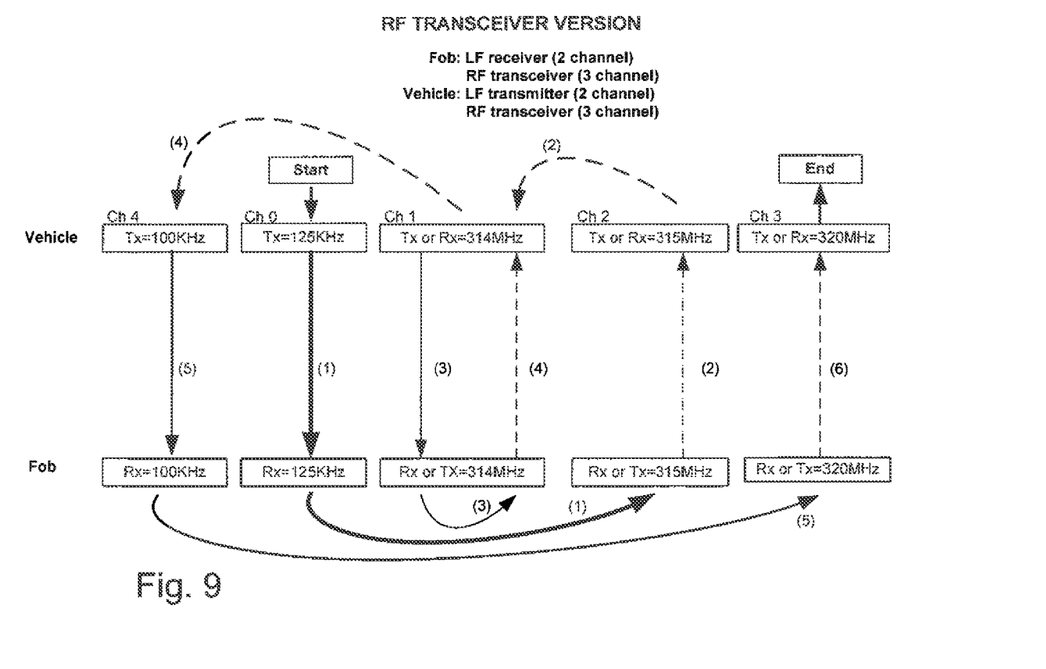
FIG. 9 shows a frequency-hopping process performed by an example embodiment of the present invention including a fob having two LF receiving channels and an RF transceiver with three RF transmit/receive channels; and, FIG. 10 shows a frequency-hopping process performed by an example embodiment of the present invention having a fob with only one LF receiving channel, but still including an RE transceiver with three RF transmit/receive channels.

FIG. 9 depicts a system wherein an RF transceiver is included within both the vehicle-based portion and the fob, and wherein the vehicle based-portion further has the capability to transmit in two LF channels. The fob is, of course, equipped to receive LF signals in either LF channel. Both RF and LF channels participate in the hopping sequence. Following initiation, the fob and vehicle-based portion proceed through an elaborate sequence of uni-directional LE and bi-directional RF messages, where the sequence is known only to them. As in the FIG. 8 variant, if only one LF channel is used, that channel may nonetheless participate in the sequence in two or more time slots. The simplest version of this "LF/RF frequency hopping sequence" variant might use only two channels: one uni-directional LF channel (125 kHz) and one bi-directional RF channel (315 MHz). The vehicle-based portion can then transmit either in the LF channel (125 kHz) or the RF channel (315 MHz), and the fob will always transmit in the RF channel.

Figure 10:
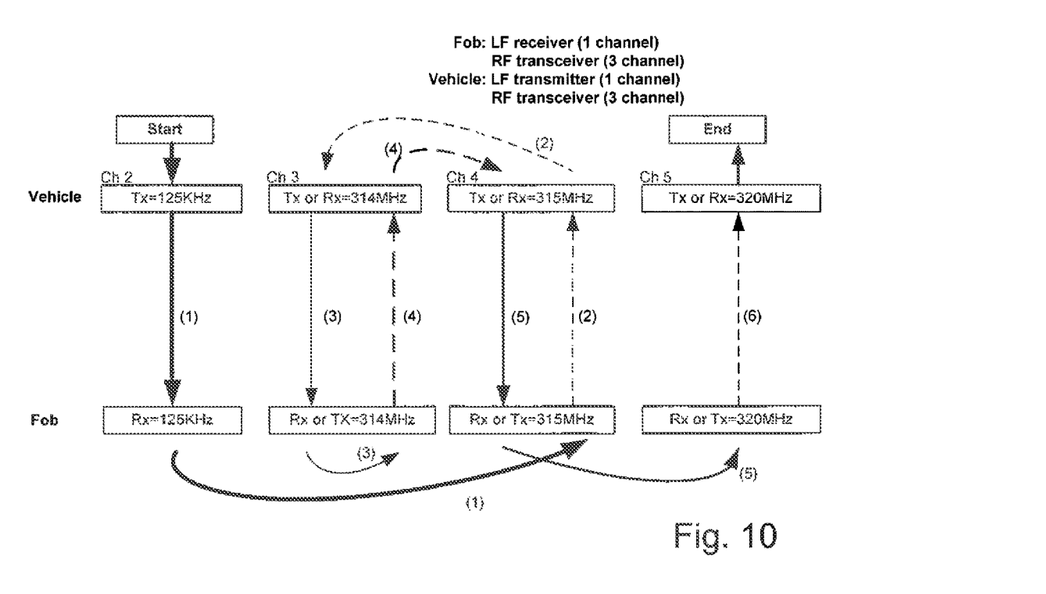

FIG. 10 depicts a similar system having an RF transceiver within both the vehicle-based portion and the fob. In this case, however, only one LF channel is included and that LF channel does not participate in the hopping sequence beyond its use in initiating the sequence.

In the embodiments shown in FIGS. 7 through 10, the communications between the fob and the vehicle are illustrated and described as occurring in a serial sequence with one communication in each time slot. The communications need not be time-segregated in this way. Instead, some or all of the communications in the LF and RF channels could occur simultaneously, since the channels are independent of one another.

For example, the fob will know the prearranged sequence of communication and can readily prepare to receive either LF or RF signals, or both signals at the same time. When the fob chooses to receive both the LF and RF channels from the vehicle at the same time, it will check the integrities of both LF and RF signals as well as their time characteristics such as the start and the stop timing of the transmissions. It can compare these times against each other as well as against the expected start/finish time. When the fob detects a false message formed by thief intervention, it will decline to respond. Thus, the thief device will not have the opportunity to calibrate out the possible delay difference between LF and RF channels introduced in relay processing.

Moreover, the use of fake transmissions may be more extensive than the examples thus far described. The LF and/or RF transmissions could be complex in term of the number of frequency channels employed, the transmission times, location of channels, and transmission formats. The transmission from vehicle or fob can be programmed to contain totally or mostly "fake" signals, not intended to be received by the fob or vehicle, as the case may be. A thief will not be able to differentiate valid transmissions from fake transmissions. Therefore, the thief will be obliged accurately to reproduce all of the transmissions, or at least to try to do so. The thief device will try to convey all of the different format information in all of the different channels, all of the time. The fob or vehicle receiver, however, will have a much easier task since each receiver will know in advance the parameters of the next true transmission that will arrive. Thus, the receivers need only listen for the expected signal, in the expected channel, at expected time, with the expect format. The fob or vehicle side receiver will ignore all of the complicated "fake" ones. The challenge introduced by the complexity of the transmission can be made sufficiently high (the number of channels, the hopping sequence, duration, the format of signals), that thieves are deterred from even attempting the task.

The methods could be applied in either one-way or two-way applications. Moveover, LF communication need not necessarily be transmitted only in a single direction, from the vehicle to the fob, as shown in the illustrated embodiments. LF could also be transmitted from the vehicle to the fob.

In all of the variants, the vehicle-based portion will monitor the frequency-hopping signals received from the fob, will analyze those signals to determine whether they match expectations within a certain acceptable tolerance, and will allow access to at least one vehicle function (e.g., door unlocking, or vehicle starting) only if the received signal fidelity is within that permissible tolerance.

From the above description of the invention, those skilled in the art will perceive improvements, changes and modifications. Such improvements, changes and modifications within the skill of the art are intended to be covered by the appended claims.

Having described the invention, the following is claimed:

1. A method for preventing security breaches of passive remote keyless entry systems for a vehicle, comprising the steps of transmitting a vehicle control command comprising a plurality of radio frequency signals from a fob to the vehicle, including the step of hopping between at least two radio frequency transmitting channels within the vehicle control command in a particular pseudo-random pattern known to the vehicle, the plurality of radio frequency signals being transmitted from the fob to the vehicle including a signal that is not normally expected to be received by the vehicle, and including the step of transmitting a particular pseudo-random pattern including fake portions, receiving at the vehicle each portion of said particular pattern and sequentially adjusting the reception to take account of the known characteristics of each portion of the known pattern, and including the step of ignoring said fake portions, detecting at the vehicle anomalies in the pattern of the received signals, and blocking access to said vehicle when detected anomalies exceed permissible limits.

2. A method as set forth in claim 1, and further comprising the step of initiating the communication sequence with a low frequency transmission from said vehicle to said fob.

3. A method as set forth in claim 1, wherein said transmitting step further includes the step of transmitting different portions of said particular pattern with different amplitudes, and wherein said step of detecting anomalies includes the step of detecting anomalies in the amplitudes of portions of said particular pattern.

4. A method as set forth in claim 1, and further comprising the step of changing from time to time the frequency channels used in said particular pattern.

5. A method as set forth in claim 1, wherein said step of hopping includes the step of hopping between at least two radio frequency transmitting channels that are widely separated from one another.

6. A method as set forth in claim 5, wherein said at least two radio frequency channels have a channel separation that is at least one hundred times as great as the bandwidth of said channels.

* * * * *